United States Patent
Matsushita et al.

(10) Patent No.: US 8,452,349 B2
(45) Date of Patent: May 28, 2013

(54) IN-VEHICLE APPARATUS

(75) Inventors: Suguru Matsushita, Obu (JP); Soichi Saito, Nagoya (JP); Ryuuji Sakata, Kariya (JP); Shinichi Yamamoto, Toyota (JP); Kazushigo Hayashi, Toyota (JP); Masao Sasaki, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/558,657

(22) Filed: Jul. 26, 2012

(65) Prior Publication Data

US 2013/0029728 A1 Jan. 31, 2013

(30) Foreign Application Priority Data

Jul. 29, 2011 (JP) ................................. 2011-166871

(51) Int. Cl.
*H04M 1/00* (2006.01)
(52) U.S. Cl.
USPC .................. 455/569.2; 455/569.1; 455/575.9; 455/564; 455/90.3
(58) Field of Classification Search
USPC ................ 455/564, 569.1, 569.2, 90.3, 575.9
See application file for complete search history.

(56) References Cited

U.S. PATENT DOCUMENTS

| 7,552,009 | B2 * | 6/2009 | Nelson | 701/425 |
| 2005/0143134 | A1 * | 6/2005 | Harwood et al. | 455/563 |
| 2007/0268906 | A1 | 11/2007 | Shozaki et al. | |
| 2008/0085745 | A1 * | 4/2008 | Ozaki | 455/569.2 |
| 2009/0253466 | A1 * | 10/2009 | Saito et al. | 455/569.2 |

FOREIGN PATENT DOCUMENTS

| JP | 11-068916 | 3/1999 |
| JP | 2008-042477 | 2/2008 |
| JP | 2008-098981 | 4/2008 |
| JP | 2009-265986 | 11/2009 |

* cited by examiner

*Primary Examiner* — Wesley Kim
(74) *Attorney, Agent, or Firm* — Harness, Dickey & Pierce, PLC

(57) ABSTRACT

A controller acquires first phonebook data from a portable Bluetooth phone via a Bluetooth interface portion, and stores the first phonebook data in a storage portion. A use flag is attached to the first phonebook data of the portable Bluetooth phone stored in the storage portion. When the use flag is set to "1," the controller stores a copy of the first phonebook data of the portable Bluetooth phone in the storage portion as second phonebook data for an in-vehicle phone. When the in-vehicle phone is selected, as a used phone, the second phonebook data for the in-vehicle phone stored in the storage portion is available.

8 Claims, 10 Drawing Sheets

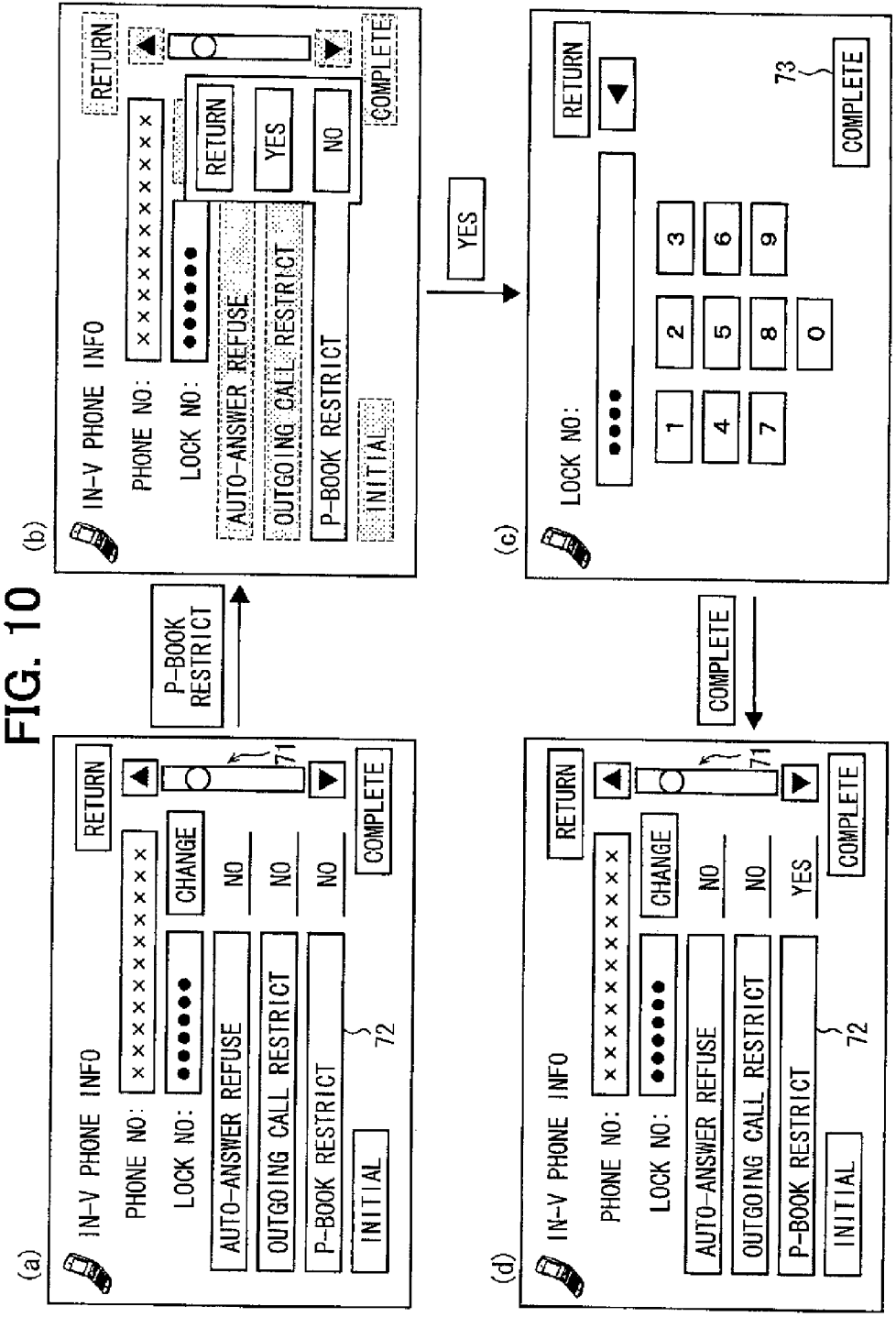

IN-VEHICLE APPARATUS

CROSS REFERENCE TO RELATED APPLICATION

This application is based on Japanese Patent Application No. 2011-166871 filed on Jul. 29, 2011, the disclosure of which is incorporated herein by reference.

TECHNICAL FIELD

The present disclosure relates to an in-vehicle apparatus, which realizes a handsfree phone call using an in-vehicle phone and a handsfree phone call using an external cellular phone connected via a communication portion, the in-vehicle apparatus having a phonebook function to store phonebook data corresponding to each of the in-vehicle phone and the cellular phone.

BACKGROUND

[Patent document 1] JP 2008-98981 A

There is conventionally an in-vehicle apparatus equipped with a function to achieve a handsfree phone call by establishing connection with an external cellular phone via a short range wireless communication. Such an in-vehicle apparatus is equipped with a data communication module (DCM) having a function as an in-vehicle phone. When the vehicle having the above in-vehicle apparatus receives a user who carries a cellular phone, the user can perform a handsfree phone call using the cellular phone. In addition, even if the above vehicle receives a user who has not a cellular phone, the user can perform a handsfree phone call using the in-vehicle phone. To that end, the above in-vehicle apparatus is provided with a phonebook function to store a plurality of separate phonebook data sets dedicated for the connected cellular phone and the in-vehicle phone, respectively.

Patent document 1 discloses a technology to transmit the phonebook data of the connected cellular phone to the in-vehicle apparatus and store the transmitted phonebook data in the in-vehicle apparatus. According to the technology, the same phonebook data as that stored in the cellular phone can be used in a handsfree phone call using the cellular phone. In contrast, the phonebook data of the in-vehicle phone can be registered or stored in the in-vehicle apparatus when a user can register phonebook data by performing a predetermined input manipulation to a manipulation portion, for example, touch switch on a touch panel provided in in-vehicle apparatus; further, the registered phonebook data can be edited.

As explained above, the phonebook data of the in-vehicle phone needs to be registered or edited by an input manipulation (for example, a manual entry etc.) of a user. Therefore, registering or editing a great number of phonebook data requires a great number of input manipulations. Thus, it is desired to improve usability about the phonebook data of the in-vehicle phone.

SUMMARY

It is an object of the present disclosure to provide an in-vehicle apparatus which can improve usability about phonebook data corresponding to an in-vehicle phone.

To achieve the above object, according to an example of the present disclosure, an in-vehicle apparatus is provided as follows. An in-vehicle phone is included to perform a voice call via a communication network. A communication portion is included to perform a communication with a portable phone, which is brought to the vehicle. A handsfree portion is included to perform (i) a first handsfree phone call using the portable phone via the communication portion and (ii) a second handsfree phone call using the in-vehicle phone. A first phonebook storage portion is included to store first phonebook data used in the first handsfree phone call using the portable phone. A second phonebook storage portion is included to store second phonebook data used in the second handsfree phone call using the in-vehicle phone. A first phonebook management section is included to acquire acquired phonebook data, which are stored in the portable phone, via the communication portion, and store the acquired phonebook data in the first phonebook storage portion as the first phonebook data. A manipulation reception portion is included to receive a predetermined manipulation of a user. A second phonebook management section is included to store copied first phonebook data in the second phonebook storage portion as the second phonebook data when a use permission manipulation of permitting use of the first phonebook data is received by the manipulation reception portion. Herein, the copied first phonebook data is a copy of the first phonebook data stored in the first phonebook storage portion.

In the above configuration, according to the user's use permission manipulation, the first phonebook data acquired from the portable phone is transmitted to the second phonebook storage portion and stored as the second phonebook data. Therefore, the registration of the second phonebook data for the in-vehicle phone can be easily achieved. In addition, even if there are a plurality of second phonebook data (i.e., a plurality of phonebook data sets), the user is only required to perform a use permission manipulation to an intended one of the plurality of phonebook data sets so as to perform the registration (storage) process automatically in the in-vehicle apparatus. For example, it is not necessary to perform troublesome input manipulations such as manual entries of characters of numbers and words. This configuration improves usability about the second phonebook data that is phonebook data corresponding to the in-vehicle phone used when performing a handsfree phone call using the in-vehicle phone. In addition, the transmission process to transmit the above-mentioned phonebook data is not performed unless the user's use permission manipulation is received. Therefore, the first phonebook data, i.e., the phonebook data stored in the portable phone, can be prevented from being used unnecessarily, thereby raising the security.

BRIEF DESCRIPTION OF THE DRAWINGS

The above and other objects, features, and advantages of the present disclosure will become more apparent from the following detailed description made with reference to the accompanying drawings. In the drawings:

FIG. 10 is a diagram illustrating an example of display windows about use restriction of phonebook data for an in-vehicle phone.

DETAILED DESCRIPTION

Figure 1:
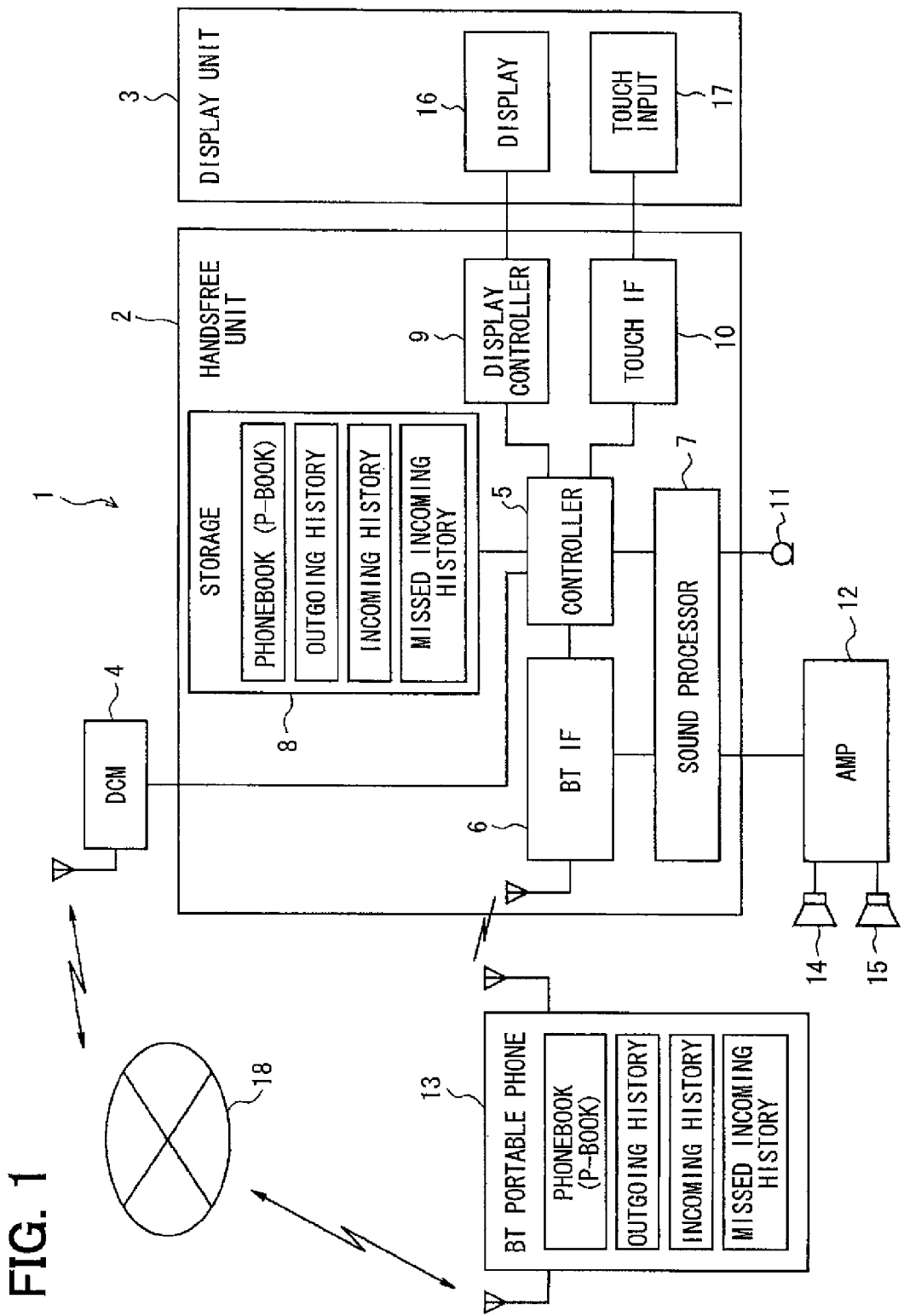
FIG. 1 is a functional block diagram of a configuration of an in-vehicle apparatus according to an embodiment of the present disclosure.

An embodiment of the present disclosure will be explained with reference to drawings. FIG. 1 is a block diagram illustrating a schematic configuration of an in-vehicle apparatus having a handsfree function and a function as an in-vehicle phone. The in-vehicle apparatus 1 is mounted, for example, in a vehicle such as an automobile and includes a handsfree unit 2, a display unit 3, and a DCM (Data Communication Module) 4. The handsfree unit 2 includes a controller 5, a Bluetooth (registered trademark, also referred to as BT) interface portion 6, a call sound processor 7, a storage portion 8, a display controller 9, and a touch manipulation interface portion 10.

The controller 5 includes a microcomputer equipped with a CPU, ROM, RAM, etc., and controls an overall operation of the handsfree unit 2 such as a communication operation and a phonebook data management operation. The BT interface portion 6 is compliant with profiles standardized in the BT communication standard, such as HFP (Hands Free Profile) for performing a handsfree communication, and PBAP (Phone Book Access Profile) and OPP (Object Push Profile) for transmitting phonebook data. Herein, the above profiles signify communication protocols defined for functions, respectively.

The call sound processor 7 is connected with a microphone 11 and an audio amplifier 12. The microphone 11 is placed inside of a vehicle compartment such as a position near the steering wheel to easily collect a user's voice or speech. The audio amplifier 12 is placed to be separate from the handsfree unit 2. A handsfree communication is performed with a BT-compliant portable phone (also referred to as a cellular phone) 13 brought into the compartment of the vehicle. In the handsfree communication, when a voice or speech uttered by the user is inputted as a transmit sound via the microphone 11, the call sound processor 7 applies a sound process to the inputted transmit sound and outputs the transmit sound having undergone the sound process to the BT interface portion 6. In contrast, when receiving a reception sound via the BT interface portion 6, the call sound processor 7 outputs the received reception sound to the audio amplifier 12. When the audio amplifier 12 receives the reception sound from the call sound processor 7, the audio amplifier 12 amplifies the reception sound and outputs the amplified sound via the speakers 14, 15. The speakers 14 and 15 are placed at positions in the driver's seat door and the passenger seat door, respectively, for example.

The storage portion 8 has a plurality of storage areas to contain phonebook data, outgoing call history data, incoming call history data, and missed incoming call history data. The phonebook data indicate a correspondence between phone numbers and registration names (e.g., holder names). The phonebook data may further indicate a correspondence between the phone numbers and other information items such as email addresses, and birth dates. The outgoing call history data indicate a correspondence between destination phone numbers of outgoing calls and clock times of the outgoing calls, which are concerned about an outgoing call from the DCM 4 or an outgoing call from the BT-compliant cellular phone 13 with which the handsfree unit 2 is under the HFP connection. The incoming call history data indicate a correspondence between source phone numbers of answered incoming calls and clock times of the answered incoming calls, which are concerned about an answered incoming call to the DCM 4 or an answered incoming call to the BT-compliant cellular phone 13 with which the handsfree unit 2 is under the HFP connection. The missed incoming call history data indicate a correspondence between source phone numbers of missed incoming calls and clock times of the missed incoming calls, which are concerned about a missed incoming call to the DCM 4 or a missed incoming call to the BT-compliant cellular phone 13 with which the handsfree unit 2 is under the HFP connection.

The display unit 3 includes a display portion 16 for displaying display windows on a screen, and a touch manipulation input portion 17 forming a touch switch on a display window or the screen. The display controller 9 of the handsfree unit 2 controls a display operation of the display portion 16 of the display unit 3 based on a display command signal, which is received from the controller 5. The touch manipulation interface portion 10 of the handsfree unit 2 receives a manipulation detection signal via the touch manipulation input portion 17 according to the user having manipulated the touch switch formed on the display window or screen and then outputs the received manipulation detection signal to the controller 5. The controller 5 of the handsfree unit 2 analyzes the received manipulation detection signal to thereby execute a predetermined process. The touch manipulation interface portion 10 may be also referred to as a manipulation reception portion to receive a manipulation or an input manipulation of the user.

The DCM 4 has a function to perform a communication operation via a communication network 18 using the phone number allocated to the DCM 4 itself. It is noted that the communication network 18 includes facilities, which provide known cellular phone communication services, such as a wireless base station, and a base station control apparatus. The DCM 4 has a configuration to enable a voice call via the communication network 18 using the handsfree unit 2. That is, the DCM 4 may be also referred to as an in-vehicle phone, which may be defined as being attached to the vehicle. Therefore, the following calls the DCM 4 as the in-vehicle phone 4.

The following refers to the BT-compliant cellular phone 13 as a BT phone 13. The BT phone 13 includes the following: a controller to control an overall operation of the BT phone 13 itself; a phone communication portion to perform a voice call via the communication network 18; a BT interface (IF) portion to perform a BT communication; a key input portion arranging various keys which a user manipulates; a storage portion; a display portion to display various display windows; a microphone to input a sound which the user utters; and a speaker which outputs as a reception sound a sound received from a call partner. The storage portion has storage areas to contain phonebook data, outgoing call history data, incoming call history data, and missed incoming history data.

The BT interface of the BT phone 13 has a function to perform BT communications with the handsfree unit 2. The BT interface portion is compliant with HFP. In addition, the BT interface is compliant with at least one of PBAP and OPP. That is, the BT phone 13 has a function to transmit phonebook data to the handsfree unit 2.

Thus, the handsfree unit 2 may be also referred to as a handsfree portion to achieve a handsfree call using the in-vehicle phone 4 and a handsfree call using the BT phone 13, which may be referred to as an external or portable phone brought in the vehicle and brought out from the vehicle. Further, the external or portable phone signifies a phone that is brought to or unattached to the vehicle and enabled to enter or exit the vehicle. In addition, the BT interface portion 6 may be also referred to as a communication portion to perform a communication with the BT phone 13 as the external phone.

Figure 2:
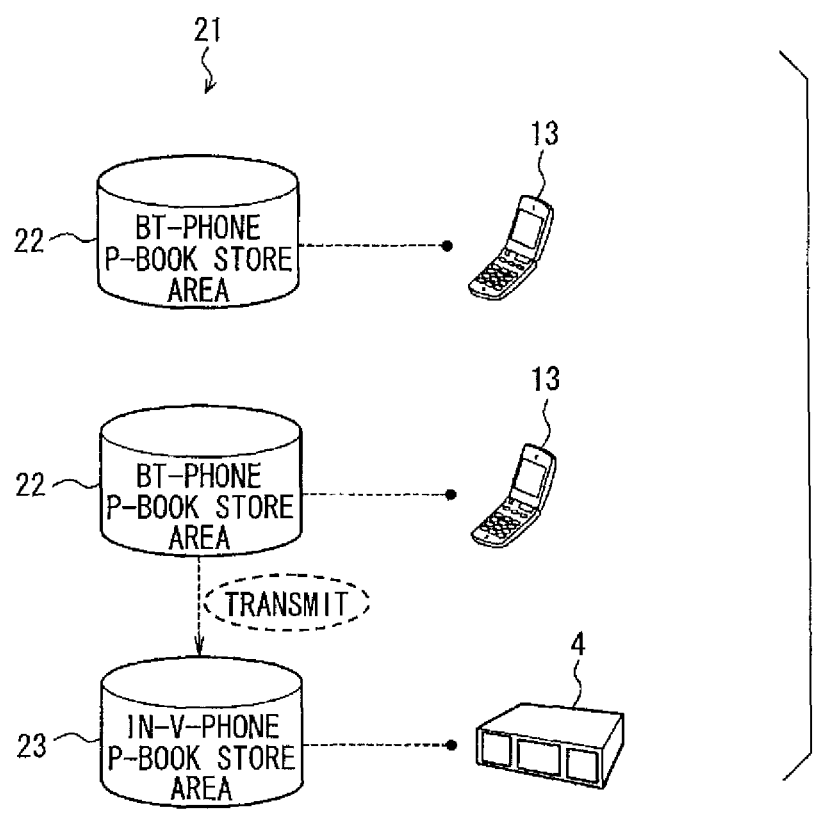
FIG. 2 is a schematic diagram illustrating a configuration of phonebook data storage areas.

FIG. 2 illustrates schematically a configuration of a phonebook data storage area 21 to store phonebook data in the storage portion 8. As illustrated in FIG. 2, the phonebook data storage area 21 contains a ST-phone use phonebook data storage area 22 as a first phonebook storage portion and an in-vehicle-phone use phonebook data storage area 23 as a second phonebook storage portion. The BT-phone use phonebook data storage area 22 can store phonebook data (also referred to as first phonebook data) corresponding to each of BT phones 13 that are enabled to be connected with the in-vehicle apparatus 1. In other words, if a plurality of BT phones 13 are registered as target phones to perform a handsfree phone call with the in-vehicle apparatus 1, the BT-phone use phonebook data storage area 22 contain a plurality of separate BT-phone use phonebook data storage areas associated with the plurality of BT phones 13, respectively. The phonebook data stored in the BT-phone use phonebook data storage area 22 may be used when using the corresponding BT phone 13. In other words, the phonebook data set for a BT phone 13 stored in the BT-phone use phonebook data storage area 22 may be used when using this BT phone 13. Storing or storage (i.e., writing) of the phonebook data in the BT-phone use phonebook data storage area 22 is executed by the controller 5. The storage may be executed in such a manner as to transmit phonebook data from the BT phone 13 using PBAP or OPP, or to store phonebook data that are prepared or edited by a predetermined input manipulation of a user.

In contrast, the in-vehicle-phone use phonebook data storage area 23 can store phonebook data (also referred to as second phonebook data) corresponding to the in-vehicle phone 4. The phone phonebook data (or data set) stored in the in-vehicle-phone use phonebook data storage area 23 may be used when using the in-vehicle phone 4. Storing or storage (i.e., writing) of the phonebook data in the in-vehicle-phone use phonebook data storage area 23 is executed by the controller 5. The storage may be executed in such a manner as to store phonebook data that are prepared or edited by a predetermined manipulation of a user or to transmit phonebook data (i.e., the BT-phone use phonebook data) from the BT-phone use phonebook data storage area 22. It is noted that unless a use permission manipulation by the user is performed, the phonebook data stored in the BT-phone use phonebook data storage area 22 or the copied phonebook data from the BT-phone use phonebook data storage area 22 are not transmitted to the in-vehicle-phone use phonebook data storage area 23.

The controller 5 may include a first phonebook management section that acquires phonebook data stored in the external BT phone 13 via the BT interface portion 6, and stores the acquired phonebook data in the BT-phone use phonebook data storage area 22. In addition, the controller 5 may include a second phonebook management section that makes a data copy of phonebook data stored in the BT-phone use phonebook data storage area 22 and stores the data copy of the phonebook data in the in-vehicle-phone use phonebook data storage area 23. Thus, the user can use the phonebook data that are stored in the above mentioned manner; thereby, the registration name may be selected without performing a direct entry of a phone number, thereby enabling a quick and simply operation for an outgoing call to a communication partner.

Figure 3:
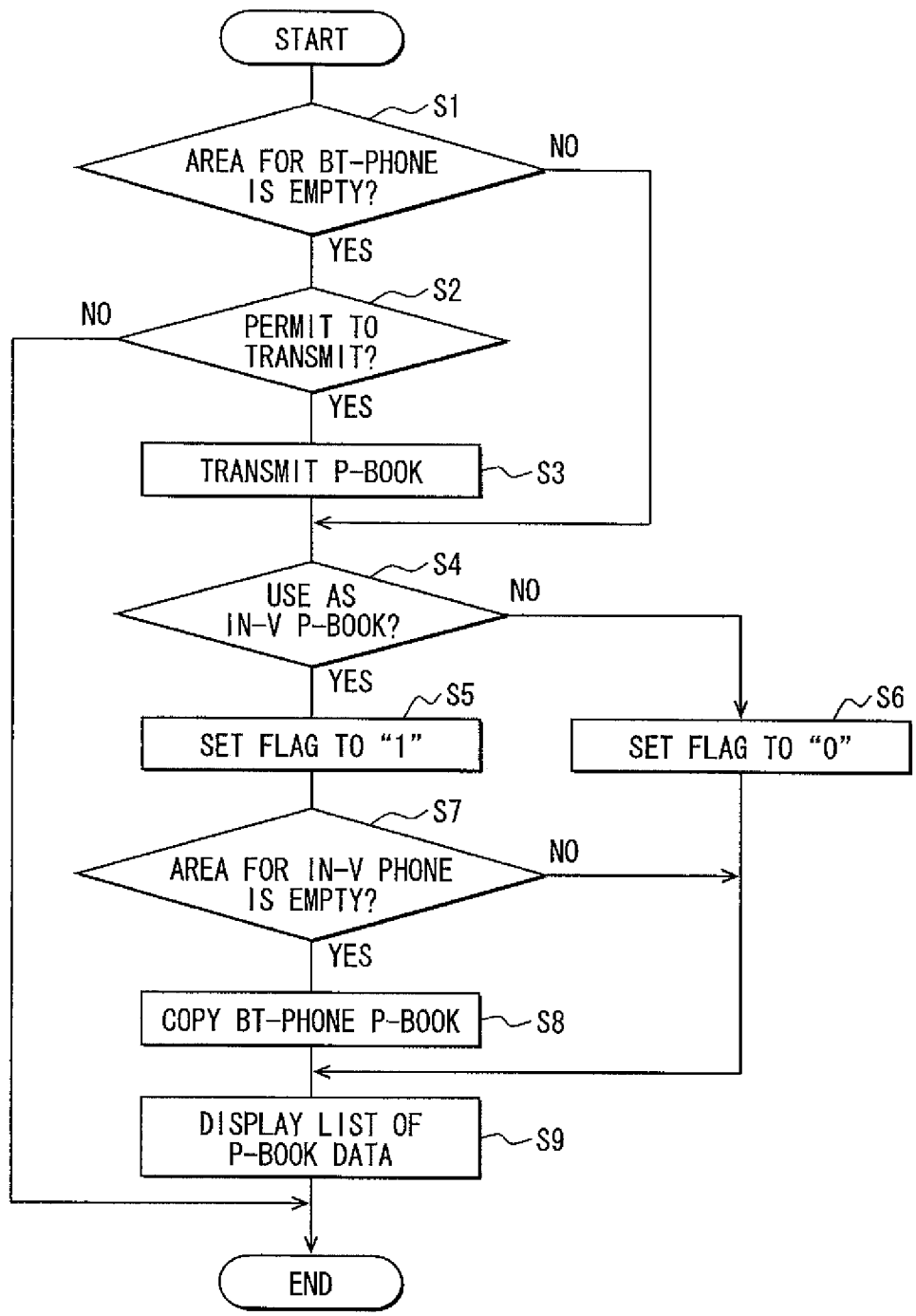
FIG. 3 is a flowchart diagram illustrating a phonebook data transmission process.

The following will explain an operation related to a phonebook function (i.e., a management method of phonebook data) of the in-vehicle apparatus 1 with reference to FIG. 3 to FIG. 10. First, the following will explain a phonebook function in cases that a BT phone 13 is a use target for a handsfree phone call. FIG. 3 is a flowchart which illustrates a phonebook data transmission process executed mainly by the controller 5. FIG. 4 to FIG. 7 indicate display examples of display windows related with a phonebook function, and illustrate display windows displayed in the display portion 16 of the display unit 3 and touch switches formed in the touch manipulation input portion 17 of the display unit 3. When a user who holds a BT phone 13 gets into the vehicle, the connection is established between the handsfree unit 2 and the BT phone 13. Then, the user performs a predetermined manipulation; thereby, the BT phone 13 held by the user is registered as a target (use target) for a handsfree phone communication (or handsfree phone call) in the handsfree unit 2. The phonebook data transmission process illustrated in FIG. 3 is executed when the phonebook function of the BT phone 13 is used under a state where the handsfree unit 2 and the BT phone 13 are connected after the above registration was completed.

The phonebook data transmission process in FIG. 3 is executed in each of four patterns 1 to 4 depending on a storage state of phonebook data in the phonebook data storage area 21. The pattern 1 is the case where any phonebook data does not exist in the BT-phone use phonebook data storage area 22 or the in-vehicle-phone use phonebook data storage area 23. The pattern 2 is the case where any phonebook data does not exist in the BT-phone use phonebook data storage area 22 and phonebook data exist in the in-vehicle-phone use phonebook data storage area 23. The pattern 3 is the case where phonebook data does exist in the BT-phone use phonebook data storage area 22 and any phonebook data does not exist in the in-vehicle-phone use phonebook data storage area 23. The pattern 4 is the case where phonebook data exist in the BT-phone use phonebook data storage area 22 and phonebook data exist in the in-vehicle-phone use phonebook data storage area 23.

(1) Patterns 1 and 2

Figure 4:
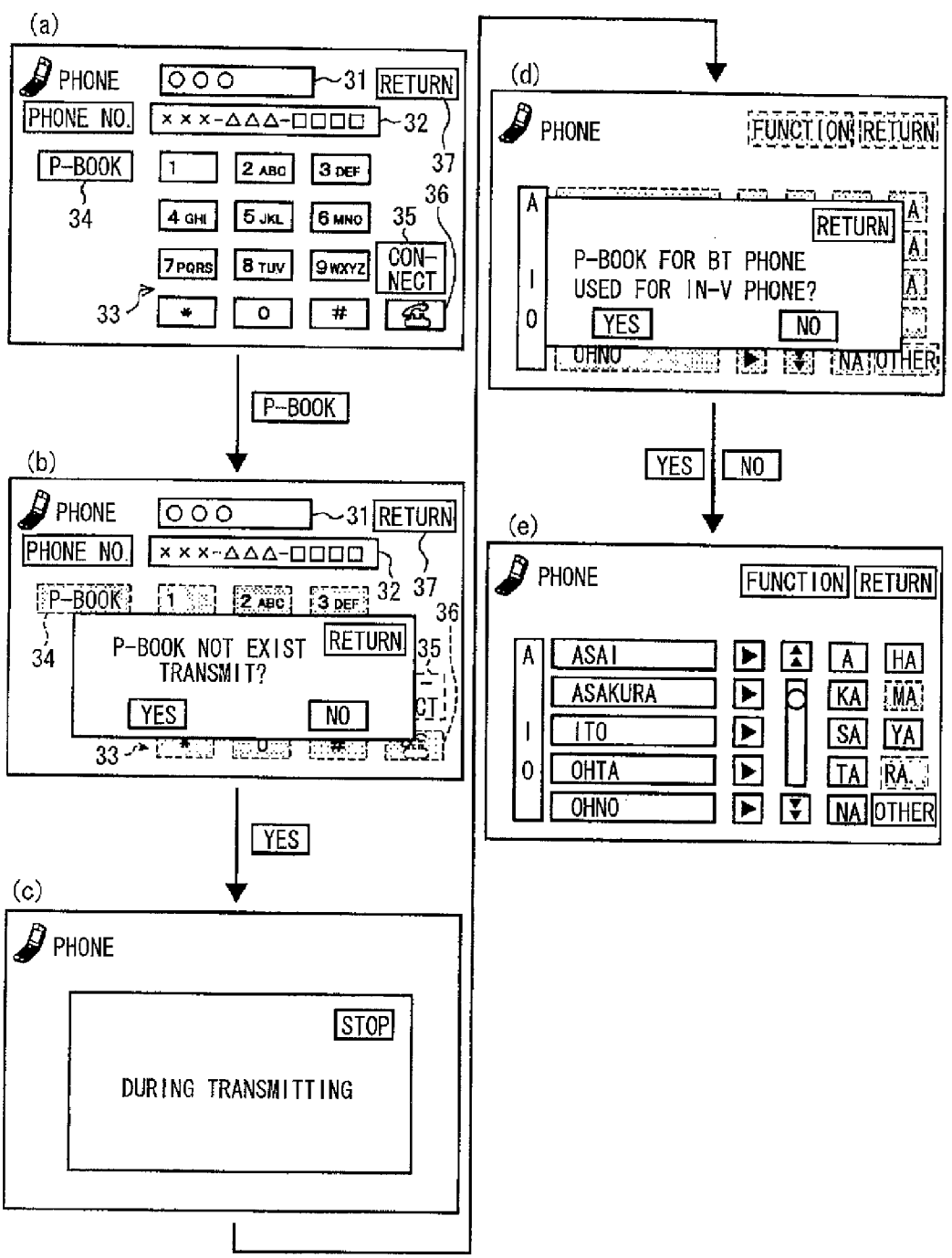
FIG. 4 is a diagram illustrating transitions of display windows of patterns 1 and 2 in the phonebook data transmission process.

FIG. 4 illustrates transitions of display windows in the patterns 1 and 2. Hereinafter, the phonebook data transmission process in the patterns 1 and 2 will be explained with reference to FIG. 3 and FIG. 4. The top display window related to a handsfree function is illustrated in (a) of FIG. 1. The top display window contains a phone name display column 31, a calling destination display column 32, and multiple touch switches. The touch switches include a key input portion 33, a "P-BOOK" button 34 indicating a phonebook button, a "CONNECT" button 35, a calling button 36, and a "RETURN" button 37.

The characters, which indicate a phone being presently a use target, are displayed in the phone name display column 31. That is, when the connected BT phone 13 is presently a use target, the model name "OOO" is displayed, for instance. When the in-vehicle phone 4 is presently a use target, the "in-vehicle phone" is displayed. The phone number of the calling destination (i.e., outgoing call destination) is displayed in the calling destination display column 32. The key input portion 33 includes the various keys that are arranged and is used when inputting a phone number of the calling destination, or when preparing phonebook data in manual entries (manually). "P-BOOK" button 34 is for using the phonebook function. "CONNECT" button 35 is for changing the use phone between phones. The calling button 36 is for starting a phone call to the phone number currently displayed in the calling destination display column 32. "RETURN" button 37 is for returning the present display window to the previous display window, that was displayed just before the present display window.

It is further noted that a flowchart or the processing of the flowchart in the present application includes sections (also referred to as steps), which are represented, for instance, as S1. Further, each section can be divided into several subsections while several sections can be combined into a single section. Furthermore, each of thus configured sections can be referred to as a device, module, or means and achieved not only (i) as a software section in combination with a hardware unit (e.g., computer), but also (ii) as a hardware section, including or not including a function of a related apparatus. Further, the hardware section may be inside of a microcomputer.

"P-BOOK" button 34 is touched; thereby, the phonebook data transmission process illustrated in FIG. 3 is started (START). At S1, it is determined whether phonebook data exist in the BT-phone use phonebook data storage area 22 corresponding to the connected BT phone 13, i.e., whether the BT-phone use phonebook data storage area 22 corresponding to the connected BT phone 13 is empty. In this case, any phonebook data do not exist in the BT-phone use phonebook data storage area 22. That is, since the BT-phone use phonebook data storage area 22 is empty (S1: YES), the flow proceeds to S2. At S2, a message is displayed which confirms with a user whether the phonebook data stored in the BT phone 13 may be transmitted to the handsfree unit 2 (refer to (b) of FIG. 4). When "NO" is selected (S2: NO), the process is completed, without transmitting the phonebook data (END). When "YES" is selected (S2:YES), the flow proceeds to S3.

At S3, the phonebook data is transmitted (or copied) from the BT phone 13 to the BT-phone use phonebook data storage area 22. In this case, the display window is displayed which indicates that it is during the transmission of the phonebook data (refer to (c) of FIG. 4). When the transmission of the phonebook data is completed, the flow proceeds to S4. At 54, a message is displayed which confirms with the user whether the use of the phonebook data for the BT phone 13 transmitted previously may be available also when using the in-vehicle phone 4 (refer to (d) of FIG. 4). When "YES" is selected (54: YES), the flow proceeds to S5.

At S5, a use flag, which is mentioned later, is set to "1," and the flow proceeds to S7. At S7, it is determined whether phonebook data exist in the in-vehicle-phone phonebook data storage area 23. In the pattern 1, any phonebook data do not exist in the in-vehicle-phone use phonebook data storage area 23. That is, since the phonebook data are absent or the in-vehicle-phone use phonebook data storage area 23 is empty (S7:YES), the flow proceeds to S8. At S8, the phonebook data stored in the BT-phone use phonebook data storage area 22 are transmitted (i.e., copied) to the in-vehicle-phone use phonebook data storage area 23. In contrast, in the pattern 2, phonebook data exist in the in-vehicle-phone use phonebook data storage area 23. That is, the phonebook data are present or the in-vehicle-phone use phonebook data storage area 23 is not empty (S7: NO), the flow proceeds to S9, without executing S8.

In contrast, "NO" is selected in the display window of (d) of FIG. 4, the flow proceeds to S6. At S6, the use flag is set to "0," and the flow proceeds to S9. At S9, a list of the phonebook data stored in the BT-phone use phonebook data storage area 22 is displayed (refer to (e) of FIG. 4), and the process is completed (END). The displayed list contains registration names in the order of the Japanese syllabary, for instance. When the BT phone 13 is presently a use target, the user only needs to select a desired registration name from the list by touch manipulation so as to perform a phone calling to the phone number associated with the registration name.

(2) Pattern 3

Figure 5:
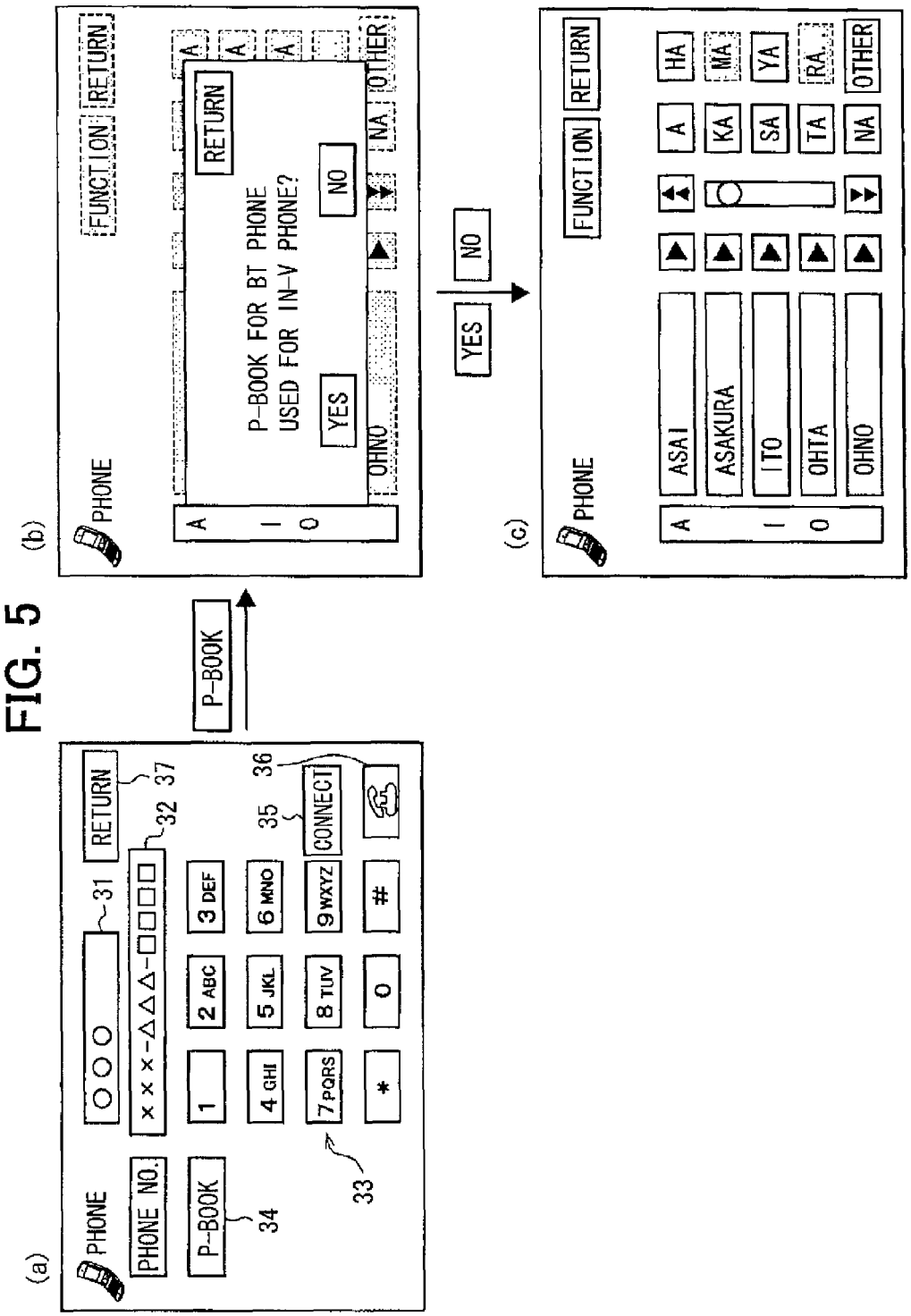
FIG. 5 is a diagram illustrating transitions of display windows of pattern 3 in the phonebook data transmission process.

FIG. 5 illustrates transitions of display windows in the pattern 3. Hereinafter; the phonebook data transmission process in the pattern 3 will be explained with reference to FIG. 3 and FIG. 5. In FIG. 5, (*a*) is equivalent to (a) of FIG. 4; (*b*) is equivalent to (d) of FIG. 4; and (c) is equivalent to (e) of FIG. 4.

"P-BOOK" button 34 is touched; thereby, the phonebook data transmission process illustrated in FIG. 3 is started (START). In this case, phonebook data exist in the BT-phone use phonebook data storage area 22. That is, the phonebook data are present or the BT-phone use phonebook data storage area 22 is not empty (S1: NO), the flow proceeds to S4, without executing S2, S3. The process subsequent to S4 is the same as that of the pattern 1; therefore, any explanation is omitted.

(3) Pattern 4

Figure 6:
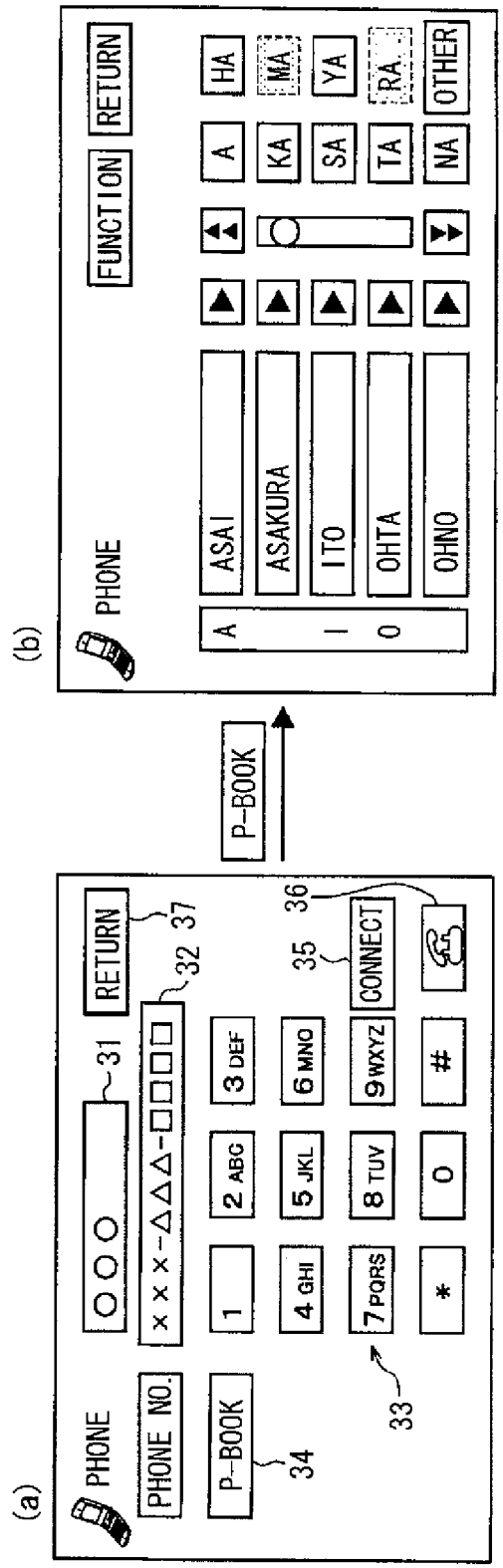
FIG. 6 is a diagram illustrating transitions of display windows of pattern 4 in the phonebook data transmission process.

FIG. 6 illustrates transitions of display windows in the pattern 4. Hereinafter, the phonebook data transmission process in the pattern 4 will be explained with reference to FIG. 3 and FIG. 6. In FIG. 6, (*a*) is equivalent to (a) of FIG. 4; and, (b) is equivalent to (e) of FIG. 4.

"P-BOOK" button 34 is touched; thereby, the phonebook data transmission process illustrated in FIG. 3 is started (START). In this case, like the pattern 3, the phonebook data are present (S1: NO), the flow proceeds to S4, without executing S2, S3. The process subsequent to S4 is the same as that of the pattern 2; therefore, any explanation is omitted.

In the phonebook data transmission process illustrated in FIG. 3, as long as the use flag is set to "1," the phonebook data stored in the BT-phone use phonebook data storage area 22 are transmitted to the in-vehicle-phone use phonebook data storage area 23, and used as the phonebook data for the in-vehicle phone 4. That is, a manipulation to set the use flag to "1" may be referred to as a use permission manipulation of permitting the use of the phonebook data stored in the BT-phone use phonebook data storage area 22. However, although the use flag is set to "0" at the beginning, it is assumed that the user may consider the change of the setup afterwards. To that end, in the present embodiment, the setup of the use flag may be changed as follows. It is noted that the following manipulation is only for changing the setup of the use flag, and the following manipulation alone cannot enable the use of the phonebook data for BT phone 13 as the phonebook data for the in-vehicle phone 4. In order to actually enable the use of it, another manipulation in the phonebook setup for the in-vehicle phone 4 is needed (explained later).

Figure 7:
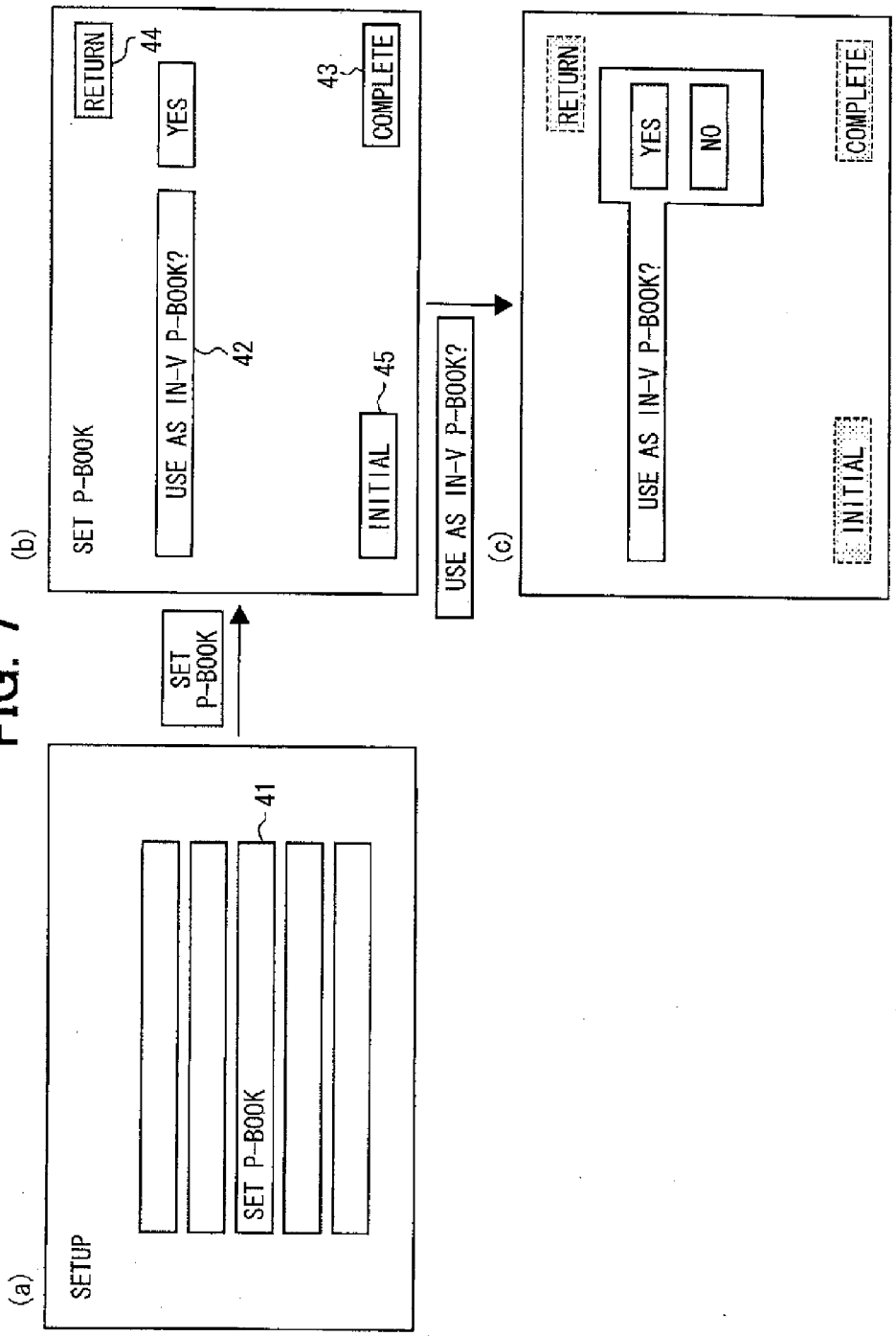
FIG. 7 is a diagram illustrating an example of display windows about change of a use permission flag.

FIG. 7 illustrates transitions of display windows when changing the use flag. In FIG. 7, images other than ones related with the setup change of the use flag are omitted. In the state where the BT phone 13 is connected, a predetermined manipulation is performed via a menu window (unshown); thereby, a setup display window is displayed which is used for performing the various setups corresponding to the BT phone 13 (refer to (a) of FIG. 7). When "SET P-BOOK" button 41 is touched in the setup display window, a phonebook setup display window is displayed which is a setup display window related to the phonebook of the BT phone 13 (refer to (b) of FIG. 7).

When "USE AS IN-V P-BOOK?" button 42 is touched in (b) of FIG. 7, a display window of (c) of FIG. 7 is displayed.

When "YES" is touched, the use flag is set to "1." When "NO" is touched, the use flag is set to "0." Then, a displayed window returns to the window display of (b) of FIG. 7, again. When "COMPLETE" button 43 is touched, a displayed window returns to the display window of (a) of FIG. 7 under the state where the above change is completed. In contrast, when "RETURN" button 44 is touched, a displayed window returns to the display window of (a) of FIG. 7 under the state where the above change is cancelled. When "INITIAL" button 45 is touched, the setup of the use flag is returned to an initial state (i.e., default value).

Further, the following will explain a phonebook function in cases that the in-vehicle phone 4 is presently a use target of a handsfree phone call. Similar to FIG. 4 to FIG. 7, FIG. 8 to FIG. 10 illustrate display examples of display windows about the phonebook function. Like (a) of FIG. 4, (a) of FIG. 8 may be referred to as a top display window related to a handsfree function. When the in-vehicle phone use phonebook data storage area 23 is empty in a state where the in-vehicle phone 4 is presently a use target, touching "P-BOOK" button 34 enables the display of a setup display window relating to the phonebook of the in-vehicle phone 4 (refer to (b) of FIG. 8). The setup display window (e.g., a manipulation list) in (b) of FIG. 8 contains "PREPARE P-BOOK" button 51, "EDIT P-BOOK" button 52, and "SET P-BOOK USE" button 53.

"PREPARE P-BOOK" button 51 is used when newly preparing or registering phonebook data. When "PREPARE P-BOOK" button 51 is touched, the phonebook preparation display window (unshown) is displayed. In this display window, when a predetermined phonebook preparation manipulation is performed by the user, phonebook data according to the manipulation is prepared. The prepared phonebook data are stored in the in-vehicle-phone use phonebook data storage area 23.

Further, "EDIT P-BOOK" button 52 is used when editing the phonebook data. When "EDIT P-BOOK" button 52 is touched, a phonebook edit display window (unshown) is displayed. In this display window, when a predetermined phonebook edit manipulation is performed by the user, the phonebook data stored in the in-vehicle-phone use phonebook data storage area 23 are edited or changed according to the manipulation. The preparation, editing, and storage of the above phonebook data are executed mainly by the controller 5. Further, the use of "SET P-BOOK USE" button 53 is mentioned later.

In contrast, the following is based on the case that the in-vehicle phone use phonebook data storage area 23 is not empty and phonebook data are stored therein in a state where the in-vehicle phone 4 is presently a use target. In this case, when "P-BOOK" button 34 is touched, a list of the phonebook data is displayed (refer to (e) of FIG. 4). Such a list of the phonebook data indicates the phonebook data stored in the in-vehicle-phone use phonebook data storage area 23. That is, the list contains the phonebook data transmitted from the BT-phone use phonebook data storage area 22 by the phonebook data transmission process, and/or the phonebook data prepared or edited by the user's input manipulation. When the in-vehicle phone 4 is presently a use target, the user only needs to select a desired registration name from the list by touch manipulation so as to perform a phone calling to the phone number associated with the registration name.

Now, the following is related to the case where the phonebook data for a BT phone 13 is not transmitted to the in-vehicle phone use phonebook data storage area 23 in the phonebook data set transmission process in FIG. 3. Even in this case, the above transmission of the phonebook data can be possible by performing the following manipulation. However, a use flag corresponding to at least one BT phone 13 needs to be set to "1." FIG. 9 illustrates transitions of display windows when transmitting the phonebook data set stored in the BT-phone use phonebook data storage area 22 to the in-vehicle-phone use phonebook data storage area 23.

Figure 8:
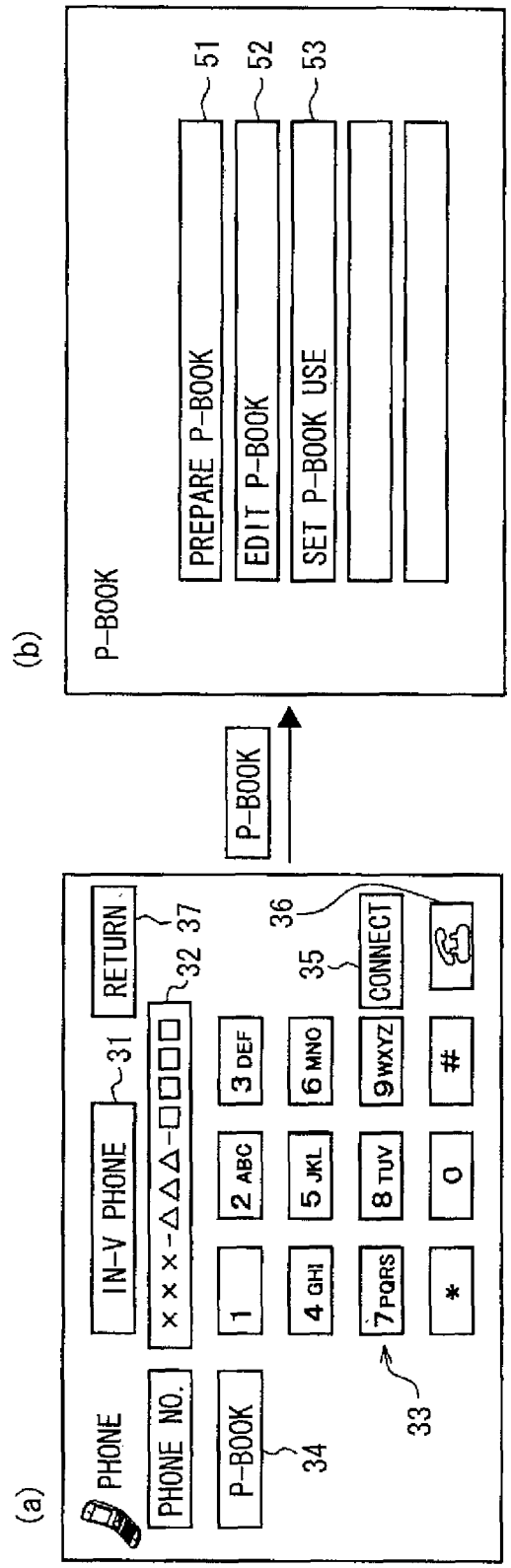
FIG. 8 is a diagram illustrating an example of display windows about phonebook setup for an in-vehicle phone.
Figure 9:
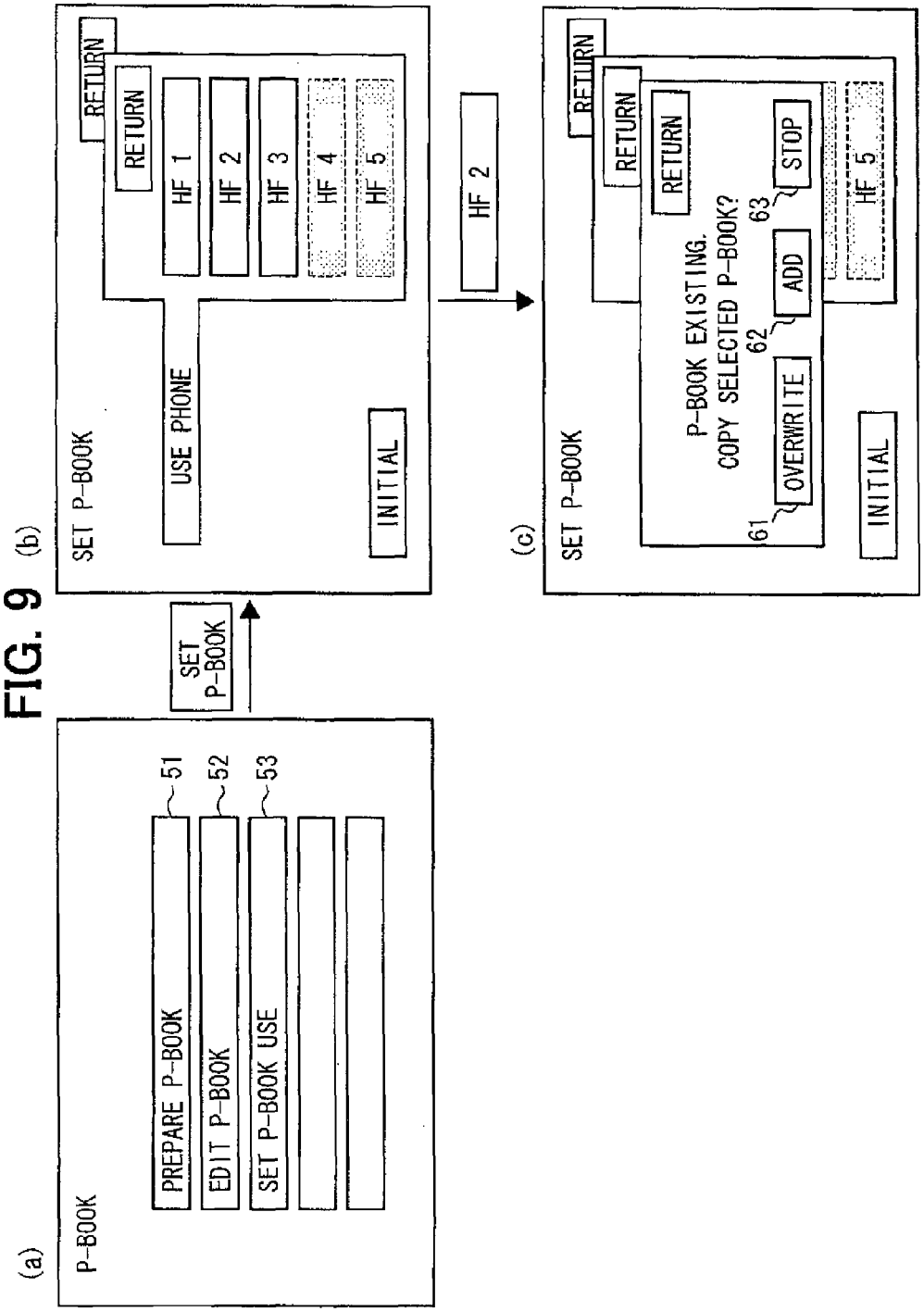
FIG. 9 is a diagram illustrating an example of display windows in selecting phonebook data of cellular phones as phonebook data for an in-vehicle phone.

In FIG. 9, (a) is a setup display window related to the phonebook of the in-vehicle phone 4, and is equivalent to (b) of FIG. 8. Herein, (a) of FIG. 9 can be displayed by performing a predetermined manipulation from a menu window (unshown). In FIG. 9, images other than ones related with the transmission of the phonebook data are omitted. Herein, when "SET P-BOOK USE" button 53 is touched, a display window is displayed which selects the phonebook data for the BT phone 13 used as phonebook data for the in-vehicle phone 4 (refer to (b) of FIG. 9). It is noted that all the use flags may be set to "0" with respect to all the BT phones 13 that are registered in the handsfree unit 2. In such a case, the above-mentioned "SET P-BOOK USE" button 53 is toned down (i.e., invalidated), and cannot be selected. In (b) of FIG. 9, only the phonebook data (only "HF 1", "HF 2" and "HF 3") of the BT phones 13 whose use flags are set to "1" are toned up (or validated). In contrast, the phonebook data ("HF 4" and "HF 5") of the BT phones 13 whose use flags are set to "0" are toned down (or invalidated).

Herein, as used in the above, the phonebook data for a single BT phone 13 may be referred to as a phonebook data set for the single BT phone; similarly, a plurality of phonebook data for a plurality of BT phones 13 may be referred to as a plurality of phonebook data sets for the plurality of BT phones 13.

In (b) of FIG. 9, predetermined phonebook data or a predetermined phonebook data set (e.g., "HF 2") may be selected or touched. In such a case, when any phonebook data is not stored in the in-vehicle-phone use phonebook data storage area 23, the selected phonebook data set is transmitted to the in-vehicle-phone use phonebook data storage area 23. In contrast, when the phonebook data are already stored in the in-vehicle-phone use phonebook data storage area 23, the confirmation regarding the transmission manners (overwrite, add, or stop) is made (refer to (c) of FIG. 9).

Upon touching "OVERWRITE" button 61, the transmitted phonebook data for the selected BT phone 13 are stored as a substitute of the phonebook data stored in the in-vehicle-phone use phonebook data storage area 23. That is, upon touching "OVERWRITE" button 61, the in-vehicle-phone use phonebook data storage area 23 comes to store only the phonebook data that are newly transmitted from the BT-phone use phonebook data storage area 22. Upon touching "ADD" button 62, the transmitted phonebook data for the selected BT phone 13 are stored to be added to the phonebook data previously stored in the in-vehicle-phone use phonebook data storage area 23. That is, upon touching "ADD" button 62, the in-vehicle-phone use phonebook data storage area 23 comes to store both (i) the previously stored phonebook data and (ii) the phonebook data that are newly transmitted from the BT-phone use phonebook data storage area 22. Upon touching "STOP" button 63, the phonebook data transmission process is stopped.

The following will explain a use restriction (security) function for phonebook data for the in-vehicle phone 4 stored in the in-vehicle-phone use phonebook data storage area 23. FIG. 10 illustrates transitions of display windows when setting the use restriction function. A setup display window for setting the various restrictions relative to the in-vehicle phone 4 is displayed based on a predetermined manipulation from a menu window (unshown) (refer to (a) of FIG. 10). Further, (a) of FIG. 10 contains an own phone number display column that displays the phone number of the in-vehicle phone 4, and a lock number display column that displays a password. Yet further, (a) of FIG. 10 contains setup windows to change the setups (YES or NO) of an auto-answering refusal function, an outgoing call restriction function, and a phonebook restriction function. Other items unshown in (a) of FIG. 10 may be displayed by manipulating a scroll bar 71 on the right side.

The phonebook restriction function is to request an input of a password when using the phonebook data stored in the in-vehicle-phone use phonebook data storage area 23. The use of such a phonebook restriction function can prevent a third party or outsider from using the phonebook data for the in-vehicle phone 4 without permission; thereby, the security can be raised. The setup of the phonebook restriction function is as follows.

That is, upon touching "P-BOOK RESTRICT" button 72, a display window in (b) of FIG. 10 is displayed. In this case, upon touching "YES," the phonebook restriction function becomes validated; upon "NO," the phonebook restriction function becomes invalidated. Further, Upon touching "RETURN", a display window of (a) of FIG. 10 is displayed without changing the setup relative to the phonebook restriction function. Upon touching "YES" or "NO," an input of a password (lock number) is requested (refer to (c) of FIG. 10). When the correct password is inputted and then "COMPLETE" button 73 is touched, a displayed window returns to the initial or first setup display window under the state where the setup of the phonebook restriction function is changed (refer to (d) of FIG. 10). When the inputted password is incorrect, a message indicating that the incorrect password input is displayed so as to urged to re-input a password. That is, unless the correct password is inputted, the setup of the phonebook restriction function is not changed.

The above configuration can provide the following effects. When a BT phone 13 is connected with the handsfree unit 2 and selected as a use target, the phonebook data (or data set) stored in the BT-phone use phonebook data storage area 22 corresponding to the connected BT phone 13 can be used. In addition, when the in-vehicle phone 4 is selected as a use target, the phonebook data (or data set) stored in the in-vehicle-phone use phonebook data storage area 23 can be used. Therefore, the user only needs to select an intended registration name of each phonebook data set with a touch manipulation so as to enable a phone calling to the phone number associated with the selected or intended registration name.

A use flag is attached to the phonebook data (or phonebook data set) stored in the BT-phone use phonebook data storage area 22. The phonebook data assigned with the use flag set to "1" is transmitted or copied in the in-vehicle-phone use phonebook data storage area 23 as the phonebook data for the in-vehicle phone 4. Therefore, the registration of the phonebook data for the in-vehicle phone 4 can be easily performed. There may be existing a plurality of phonebook data (i.e., a plurality of phonebook data sets, and the number of the plurality of phonebook data or data sets is many. Even in such a case, the user is only required to perform the setup of the use flag attached to an intended phonebook data set; thereby, the data transmission or copy can be automatically executed in the in-vehicle apparatus 1. Therefore, the usability can be improved as compared with the case that the registration of the phonebook data for the in-vehicle phone 4 is made by a user's manipulation such as a manual entry of each phone number or related information items, for instance.

As explained above, unless the use flag is set to "1," the phonebook data for the corresponding BT phone 13 is not transmitted or copied in the in-vehicle-phone use phonebook data storage area 23. The setup of the use flag relative to a BT phone 13 is performed by a user who owns or has the BT phone 13. This configuration can prevent the phonebook data stored in the BT-phone use phonebook data storage area 22 (i.e., the phonebook data stored in the BT phone 13) from being used thoughtlessly, thereby improving the security.

The setup of the use flag is performed when using the phonebook function for the first time after registering the BT phone 13. Further, the setup of the use flag may be also changed thereafter Such a configuration can provide an advantage when the vehicle is shared by more than one user. That is, a user can make the setup of the use flag so as to enable the use of the phonebook data corresponding to the BT phone 13 held by the user as the phonebook data for the in-vehicle phone 4 when using the vehicle, for instance. Alternatively, a user can make the setup of the use flag so as to disable the use of the phonebook data corresponding to the BT phone 13 held by the user as the phonebook data for the in-vehicle phone 4, for instance. Such a configuration can help prevent other users from using the phonebook data of the BT phone 13 held by the user, thereby improving the security.

In the phonebook data transmission process illustrated in FIG. 3, the phonebook data for the BT phone 13 whose use flag is set to "1" is transmitted to the in-vehicle-phone use phonebook data storage area 23. In this case, the determination at S7 is provided to determine whether the in-vehicle-phone use phonebook data storage area 23 is empty. When it is empty (S7: YES), the transmission of the above phonebook data is executed. This configuration can prevent the already stored phonebook data in the in-vehicle-phone use phonebook data storage area 23 from being changed or erased carelessly because of automatically transmitting the phonebook data.

In the setup about the phonebook of the in-vehicle phone 4, when a BT phone 13 whose use flag is set to "1" is under connection, the phonebook data of the BT phone 13 is transmitted to the in-vehicle-phone use phonebook data storage area 23. In this case, when the in-vehicle-phone use phonebook data storage area 23 is empty, the phonebook data is transmitted directly. In contrast, when the in-vehicle-phone use phonebook data storage area 23 is not empty, the data transmission manner or method (e.g., overwrite, add) is confirmed with a user. The user only needs to select "overwrite" or "add" when the phonebook data already stored in the in-vehicle-phone use phonebook data storage area 23 is unnecessary or necessary, respectively. Such a confirmation with a user can improve usability of the phonebook data for the in-vehicle phone 4.

When the in-vehicle phone use phonebook data storage area 23 is empty in a state where the in-vehicle phone 4 is presently a use target, the phonebook function may be used. In this case, a setup display window relative to the phonebook of the in-vehicle phone 4 appears (refer to (b) of FIG. 8). The setup display window can be changed to a phonebook preparation display window for preparing a phonebook, or a setup display window for enabling the transmission of the phonebook data from the BT-phone use phonebook data storage area 22. This configuration can urge a user to register phonebook data when the phonebook data for the in-vehicle phone 4 is empty.

In addition, the transition can be made from the above setup display window to the phonebook editing display window for editing the phonebook data for the in-vehicle phone 4. In this display window, when a predetermined phonebook editing manipulation is performed by the user, the phonebook data stored in the in-vehicle-phone use phonebook data storage area 23 is edited or changed according to the manipulation.

The phonebook data in the BT-phone use phonebook data storage area 22 may be transmitted to and stored in the in-vehicle-phone use phonebook data storage area 23. Such a stored phonebook data is identical to the phonebook data for the BT phone 13, but copied from the BT-phone use phonebook data storage area 22. Therefore, the editing of the phonebook data for the in-vehicle phone 4 can be made without affecting the original phonebook data for the BT phone 13. This can improve also usability.

The present disclosure is not limited to the embodiment described above and illustrated in the drawings, and can be modified or expanded as follows, for instance. A communication portion to communicate between the in-vehicle apparatus and an external portable phone need not be limited to the BT interface portion. That is, the connection between the in-vehicle apparatus and the external portable phone need not be limited to the Bluetooth communication. Instead, another short range wireless communication may be used, or another wired communication may be used. When the communication portion in the in-vehicle apparatus is changed, a communication portion of the external portable phone may be changed to follow the communication portion used in the in-vehicle apparatus. In this case, a communication protocol for a handsfree phone call or transmission of phonebook data may be also changed as needed.

The configuration may be adopted which integrates the in-vehicle apparatus 1 with a navigation apparatus for the vehicle. Such a configuration can reduce as a whole an overall configuration by using part of the elements of the navigation apparatus such as the display unit 3, the BT interface portion 6, the storage portion 8, the display controller 9, and the touch manipulation interface portion 10. Thereby, the cost cut and the size down can be achieved as a whole.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An in-vehicle apparatus in a vehicle, the apparatus comprising:
    an in-vehicle phone to perform a voice call via a communication network;
    a communication portion to perform a communication with a portable phone different than the in-vehicle phone, which is brought to the vehicle;
    a handsfree portion to perform (i) a first handsfree phone call using the portable phone via the communication portion and (ii) a second handsfree phone call using the in-vehicle phone;
    a first phonebook storage portion to store first phonebook data used in the first handsfree phone call using the portable phone;
    a second phonebook storage portion to store second phonebook data used in the second handsfree phone call using the in-vehicle phone;
    a first phonebook management section to
        acquire acquired phonebook data, which are stored in the portable phone, via the communication portion, and
        store the acquired phonebook data in the first phonebook storage portion as the first phonebook data;
    a manipulation reception portion to receive a predetermined manipulation of a user; and
    a second phonebook management section to store copied first phonebook data in the second phonebook storage portion as the second phonebook data used in the second handsfree call using the in-vehicle phone when a use permission manipulation of permitting use of the first phonebook data is received by the manipulation reception portion,
        the copied first phonebook data being a copy of the first phonebook data, the first phonebook data having been already stored in the first phonebook storage portion before a time when the use permission manipulation is received by the manipulation reception portion.

2. The in-vehicle apparatus according to claim 1, wherein:
the second phonebook management section edits the second phonebook data stored in the second phonebook storage portion based on a phonebook editing manipulation that is received by the manipulation reception portion.

3. The in-vehicle apparatus according to claim 1, wherein:
the first phonebook storage portion stores a plurality of first phonebook data that correspond to, respectively, a plurality of different portable phones; and
the second phonebook management section stores one of the plurality of first phonebook data as the second phonebook data,
    using of the one of the plurality of first phonebook data being permitted based on the use permission manipulation.

4. The in-vehicle apparatus according to claim 1, wherein:
when the second phonebook management section stores the copied first phonebook data upon receiving the use permission manipulation in cases that the second phonebook storage portion has already stored phonebook data,
the copied first phonebook data is stored in the second phonebook storage portion
    (i) as being added to the phone book data already stored in the second phonebook storage portion or
    (ii) as replacing the phone book data already stored in the second phonebook storage portion by overwriting the second phonebook storage.

5. The in-vehicle apparatus according to claim 1, wherein:
when the second phonebook management section stores the copied first phonebook data upon receiving the use permission manipulation in cases that the second phonebook storage portion stores no phonebook data,
the copied first phonebook data is stored in the second phonebook storage portion as the second phonebook data used in the second handsfree phone call using the in-vehicle phone.

6. The in-vehicle apparatus according to claim 1, wherein:
the in-vehicle phone is mounted as a communication module in the vehicle before the user is located inside of the vehicle.

7. The in-vehicle apparatus according to claim 1, wherein the in-vehicle phone is attached to the vehicle as a communication module prior to the portable phone being brought to the vehicle.

8. The in-vehicle apparatus according to claim 7, wherein the in-vehicle phone is hard wired to the vehicle.

* * * * *

UNITED STATES PATENT AND TRADEMARK OFFICE
CERTIFICATE OF CORRECTION

PATENT NO. : 8,452,349 B2
APPLICATION NO. : 13/558657
DATED : May 28, 2013
INVENTOR(S) : Suguru Matsushita et al.

It is certified that error appears in the above-identified patent and that said Letters Patent is hereby corrected as shown below:

Title Page, (75) Inventors, "Kazushigo Hayashi", Toyota (JP)" should read -- Kazushige Hayashi --.

Signed and Sealed this
Twenty-third Day of July, 2013

Teresa Stanek Rea
*Acting Director of the United States Patent and Trademark Office*